US011366683B2

(12) United States Patent
Wang et al.

(10) Patent No.: US 11,366,683 B2
(45) Date of Patent: Jun. 21, 2022

(54) IMAGES DEPLOYMENT SYSTEM ACROSS MULTIPLE ARCHITECTURES

(71) Applicant: International Business Machines Corporation, Armonk, NY (US)

(72) Inventors: Yuan Yuan Wang, Beijing (CN); Qi Feng Huo, Beijing (CN); Da Li Liu, Beijing (CN); Cdl Lei Li, Beijing (CN); Yan Song Liu, Beijing (CN); Tian Xiaoyi, Beijing (CN); Shu Chao Wan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 16/734,279

(22) Filed: Jan. 3, 2020

(65) Prior Publication Data
US 2021/0208916 A1  Jul. 8, 2021

(51) Int. Cl.
*G06F 9/46* (2006.01)
*G06F 9/455* (2018.01)
(Continued)

(52) U.S. Cl.
CPC ........ *G06F 9/45558* (2013.01); *G06F 16/955* (2019.01); *G06N 3/04* (2013.01);
(Continued)

(58) Field of Classification Search
CPC ............... G06F 9/45558; G06F 16/955; G06F 2009/45562; G06F 2009/45591; G06F 2009/45595; G06N 3/04
(Continued)

(56) References Cited

U.S. PATENT DOCUMENTS 9,015,710 B2    4/2015  Spivak et al.
11,029,975 B2 * 6/2021  Prasad .................. G06F 21/577
(Continued)

FOREIGN PATENT DOCUMENTS

CN    105824614 B    5/2019
CN    106936636 B    8/2019

OTHER PUBLICATIONS

"Library (computing)", Wikipedia, Jan. 2, 2019 (Year: 2019).*
(Continued)

*Primary Examiner* — Bradley A Teets
(74) *Attorney, Agent, or Firm* — Law Office of Jim Boice

(57) ABSTRACT

A process deployment controller creates an updated image for an intermediary engine in order to execute one or more applications on a host infrastructure. The process deployment controller generates a partial image by executing source code from a template repository. The partial image provides a structure used to create an intermediary engine used with a container, which includes an application, as well as binaries and libraries required to execute the application in an infrastructure via the intermediary engine. The process deployment controller transmits an identifier of the infrastructure to a component registry; receives a component description of the infrastructure from the component registry; and uses the component description to create an updated image of the partial image. The process deployment controller, upon receiving a request for the application to run on the infrastructure, utilizes the updated image and intermediary engine to execute the application on the infrastructure.

18 Claims, 11 Drawing Sheets

(51) Int. Cl.
*G06N 3/04* (2006.01)
*G06F 16/955* (2019.01)

(52) U.S. Cl.
CPC .............. *G06F 2009/45562* (2013.01); *G06F 2009/45591* (2013.01); *G06F 2009/45595* (2013.01)

(58) Field of Classification Search
USPC .......................................................... 718/1
See application file for complete search history.

(56) References Cited

U.S. PATENT DOCUMENTS

| | | | |
|---|---|---|---|
| 2008/0091929 A1* | 4/2008 | Oberhaus | G06F 9/4416 |
| | | | 713/1 |
| 2017/0147813 A1 | 5/2017 | McPherson et al. | |
| 2017/0264684 A1 | 9/2017 | Spillane et al. | |
| 2018/0034150 A1 | 2/2018 | Rezvani et al. | |
| 2018/0349150 A1 | 12/2018 | Wong et al. | |
| 2019/0155633 A1* | 5/2019 | Faulhaber, Jr. | G06F 9/45558 |
| 2019/0354354 A1* | 11/2019 | Dubinskii | G06F 11/301 |

OTHER PUBLICATIONS

P. Mell et al., "The NIST Definition of Cloud Computing", National Institute of Standards and Technology, Information Technology Laboratory, Sep. 2011, pp. 1-7.

* cited by examiner

IMAGES DEPLOYMENT SYSTEM ACROSS MULTIPLE ARCHITECTURES

BACKGROUND

The present invention relates to the application deployments across multiple architectures. Still more specifically, the present invention relates to the field of deploying applications across multiple architectures whose descriptions are not initially available to a process deployment controller.

SUMMARY

In an embodiment of the present invention, a process deployment controller creates an image for an intermediary engine operating on a host operating system in order to execute one or more applications on a host infrastructure. The process deployment controller generates a partial image by executing source code from a template repository. The partial image provides a structure used to create an intermediary engine used with a container, which includes an application, as well as binaries and libraries that are required to execute the application in an infrastructure via an intermediary engine. The partial image lacks a component description of the infrastructure, and the component description of the infrastructure is inaccessible to the process deployment controller. The process deployment controller transmits an identifier of the infrastructure to a component registry, which contains the component description of the infrastructure. The process deployment controller receives the component description of the infrastructure from the component registry, and creates an updated image of the partial image, which now includes the component description of the infrastructure. The process deployment controller receives a request for the application to run on the infrastructure, and utilizes the updated image and the intermediary engine to execute the application on the infrastructure.

In one or more embodiments, the method(s) described herein are performed by an execution of a computer program product.

DETAILED DESCRIPTION

Figure 1:
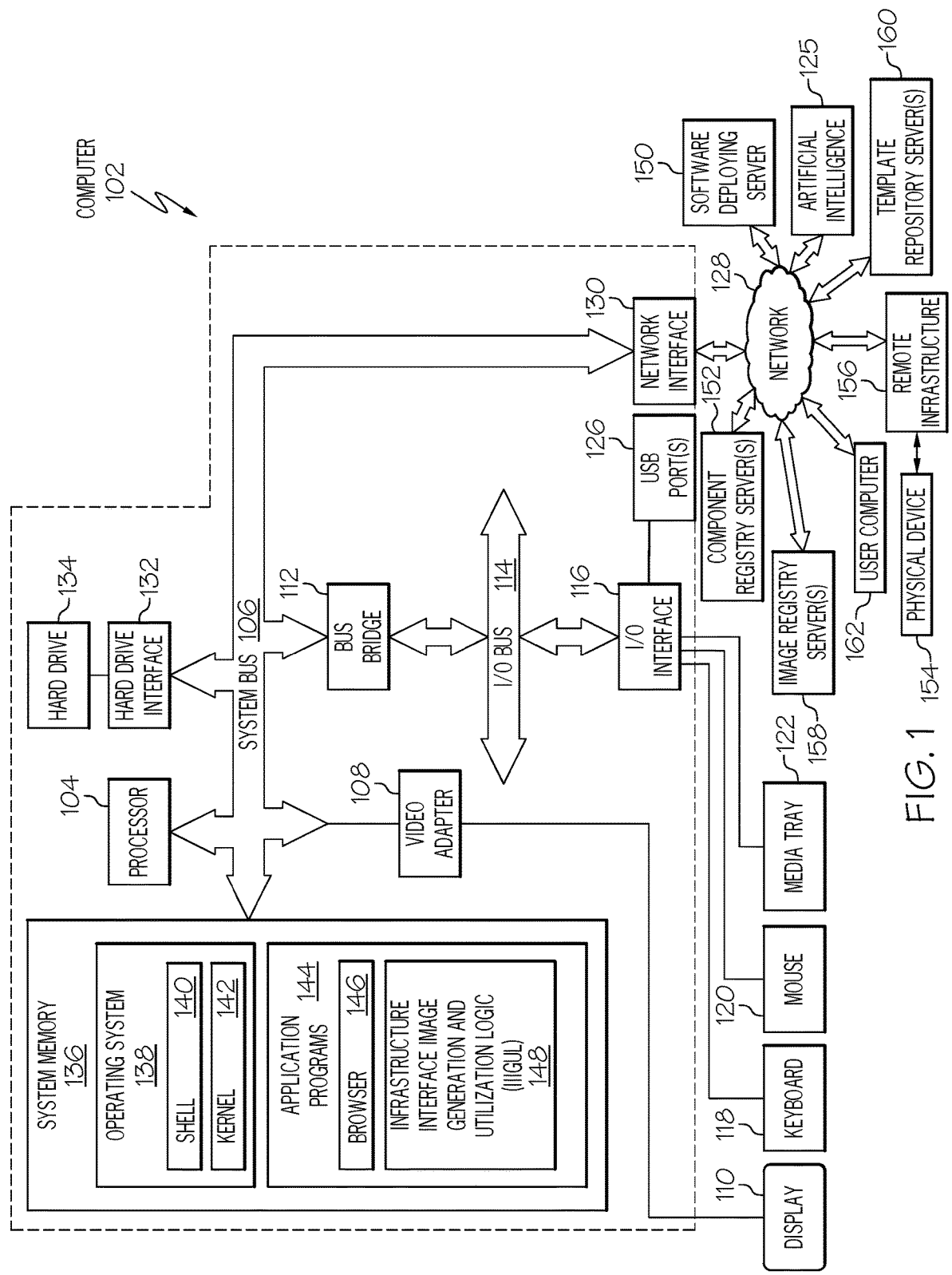
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

With reference now to the figures, and in particular to FIG. 1, there is depicted a block diagram of an exemplary system and network that may be utilized by and/or in the implementation of one or more embodiments of the present invention. Note that some or all of the exemplary architecture, including both depicted hardware and software, shown for and within computer 102 may be utilized by artificial intelligence 125 and/or software deploying server 150 and/or component registry server(s) 152 and/or physical device 154 and/or remote infrastructure 156 and/or image registry server(s) 158 and/or template repository server(s) 160 and/or user computer 162 shown in FIG. 1, and/or host computer 202 shown in FIG. 2.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a network 128 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, one or more embodiments of the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory also include an Infrastructure Interface Image Generation and Utilization Logic (IIIGUL) 148. IIIGUL 148 includes code for implementing the processes described below, including those described in FIGS. 2-9. In one or more embodiments of the present invention, computer 102 is able to download IIIGUL 148 from software deploying server 150, including in an on-demand basis, wherein the code in IIIGUL 148 is not downloaded until needed for execution. Note further that, in one or more embodiments of the present invention, software deploying server 150 performs all of the functions associated with the present invention (including execution of IIIGUL 148), thus freeing computer 102 from having to use its own internal computing resources to execute IIIGUL 148.

As noted above, computer 102 is able to communicate with other resources via network 128. For example, assume that computer 102 is functioning as a process deployment controller, such as the process deployment controller 402 shown in FIG. 4.

Figure 2:
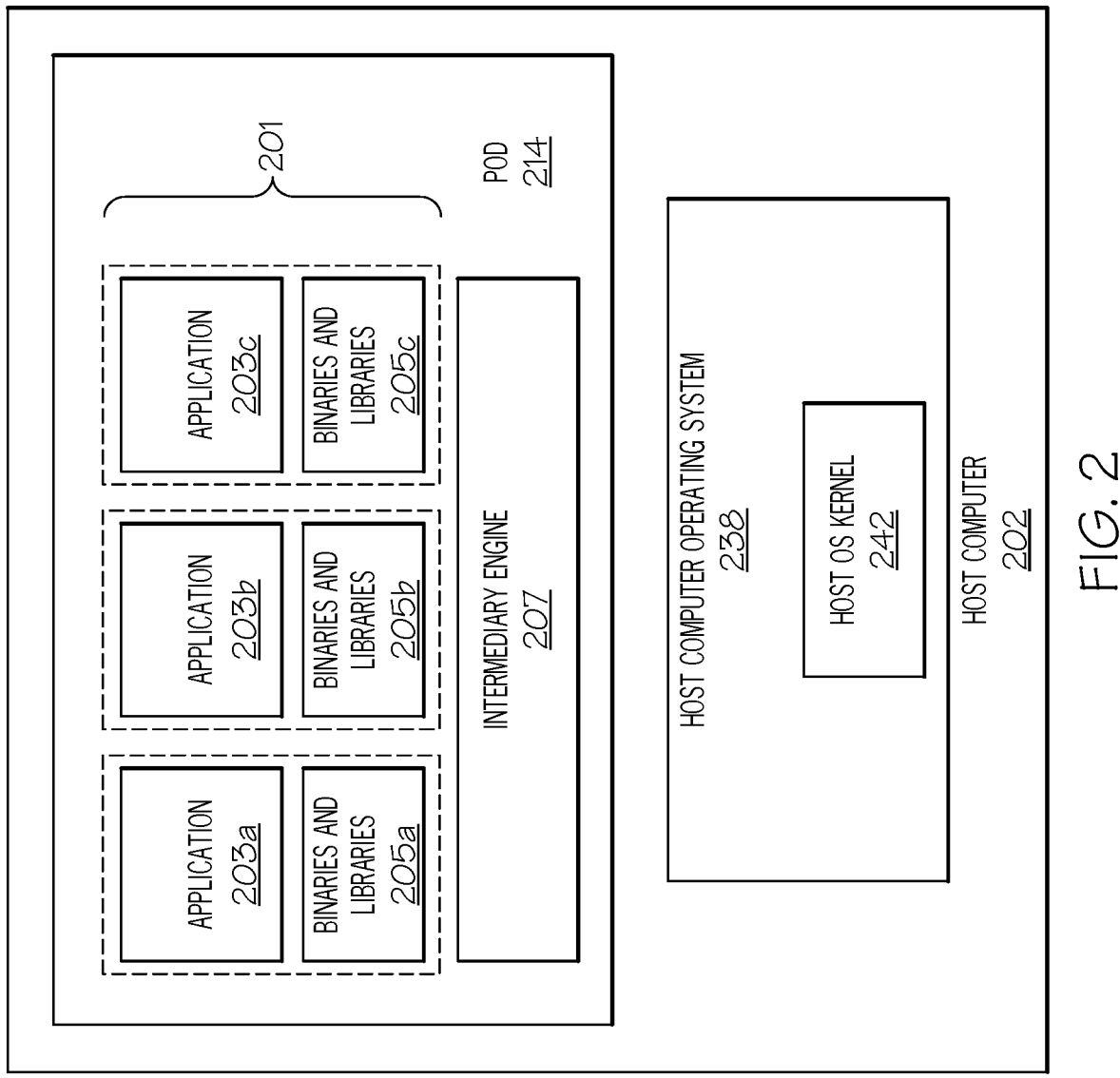
FIG. 2 illustrates exemplary detail of one or more pods depicted in FIG. 3.

The process deployment controller 402 is a controller that manages interface engines, such as the intermediary engine 207 shown in FIG. 2. In order to manage such an interface engine, and in accordance with one or more embodiments of the present invention, the process deployment controller 402 utilizes one or more of artificial intelligence 125 and/or component registry server(s) 152 and/or remote infrastructure 156 and/or image registry server(s) 158 and/or template repository server(s) 160 to generate and/or manage infrastructure images and intermediary engines, as described in detail below.

Note that the hardware elements depicted in computer 102 are not intended to be exhaustive, but rather are representative to highlight essential components required by one or more embodiments of the present invention. For instance, computer 102 may include alternate memory storage devices such as magnetic cassettes, digital versatile disks (DVDs), Bernoulli cartridges, and the like. These and other variations are intended to be within the spirit and scope of the present invention.

When running on a particular type of computer, applications interface with the operating system (OS) of that computer, in order to utilize the resources (e.g., input devices, storage devices, etc.) on that computer. More specifically, a component of the operating system running on the computer, known as the kernel, is given control of the resources after the computer boots up by running a basic input/output system (BIOS) routine on its processor. The kernel provides a set of library functions (also known as system calls) that provide access to memory, storage devices, displays, keyboards, etc. in the computer. Thus, applications are traditionally written such that they function with a particular OS/kernel. However, this limits the application(s) to operating on a particular type of computer/processor using a particular OS/kernel, even though other types of computers with different operating systems may be available.

As such, one or more embodiments utilize an intermediary engine, such as a DOCKER® engine (DOCKER is a registered trademark of Docker, Inc. in the United States and/or other countries).

Unlike a virtual machine, in which a guest operating system in the virtual machine interfaces with a hypervisor for a host computer, DOCKER utilizes the host OS, which resides on the host computer, through the use of containers and a DOCKER engine. That is, in a DOCKER architecture, a container (made up of an application along with binaries/libraries required by the application) interface with the DOCKER engine, which provides an interface with the host OS of the host computer. The container and the DOCKER engine collectively make up a "pod", which is a self-contained infrastructure for executing the application by using the host OS on the host computer.

With reference then to FIG. 2, an exemplary DOCKER pod as used in one or more embodiments of the present invention is illustrated as pod 214. As depicted in FIG. 2, assume that pod 214 is running on a host computer 202 (which is architecturally analogous to computer 102 shown in FIG. 1). Host computer 202 has its own host computer operating system (OS) 238 (analogous to OS 138 shown in FIG. 1). The host computer OS 238 includes a host OS kernel 242 (analogous to kernel 142 shown in FIG. 1). The host computer 202 includes a processor, system memory, input/output devices, storage devices, etc., as shown for computer 102 in FIG. 1 but not depicted in FIG. 2, which are accessed/managed/controlled by the host OS kernel 242.

The host computer OS 238 interfaces with an intermediary engine 207, which in a DOCKER environment is called a DOCKER engine. An "intermediary engine" is defined as a software structure that provides an interface, between one or more applications and a host operating system, which enables the one or more applications to run on the host operating system.

Thus, and as shown in FIG. 2, intermediary engine 207 provides an interface between the host computer OS 238, including the host OS kernel 242, and one or more applications, depicted as application 203a, application 203b, and application 203c. Each of the applications has an associated set of binaries (i.e., various files used by an application) and libraries (i.e., pre-written code and subroutines used by the application). Thus, the containers 201 shown in FIG. 1 includes application 203a paired with binaries/libraries 205a; application 203b paired with binaries/libraries 205b; application 203c paired with binaries/libraries 205c; and so on if additional applications are running on the intermediary engine 207. The intermediary engine 207 provides a structure that allows one or more of the containers 201 to interact with the host OS 239, in order to execute on the host computer 202. In a DOCKER system, multiple pods can operate on a same host computer (e.g., host computer 202), which in a DOCKER architecture is called a node. A node can be a worker node (which provides the architecture that executes the pod) or a master node (which manages one or more worker nodes).

Figure 3:
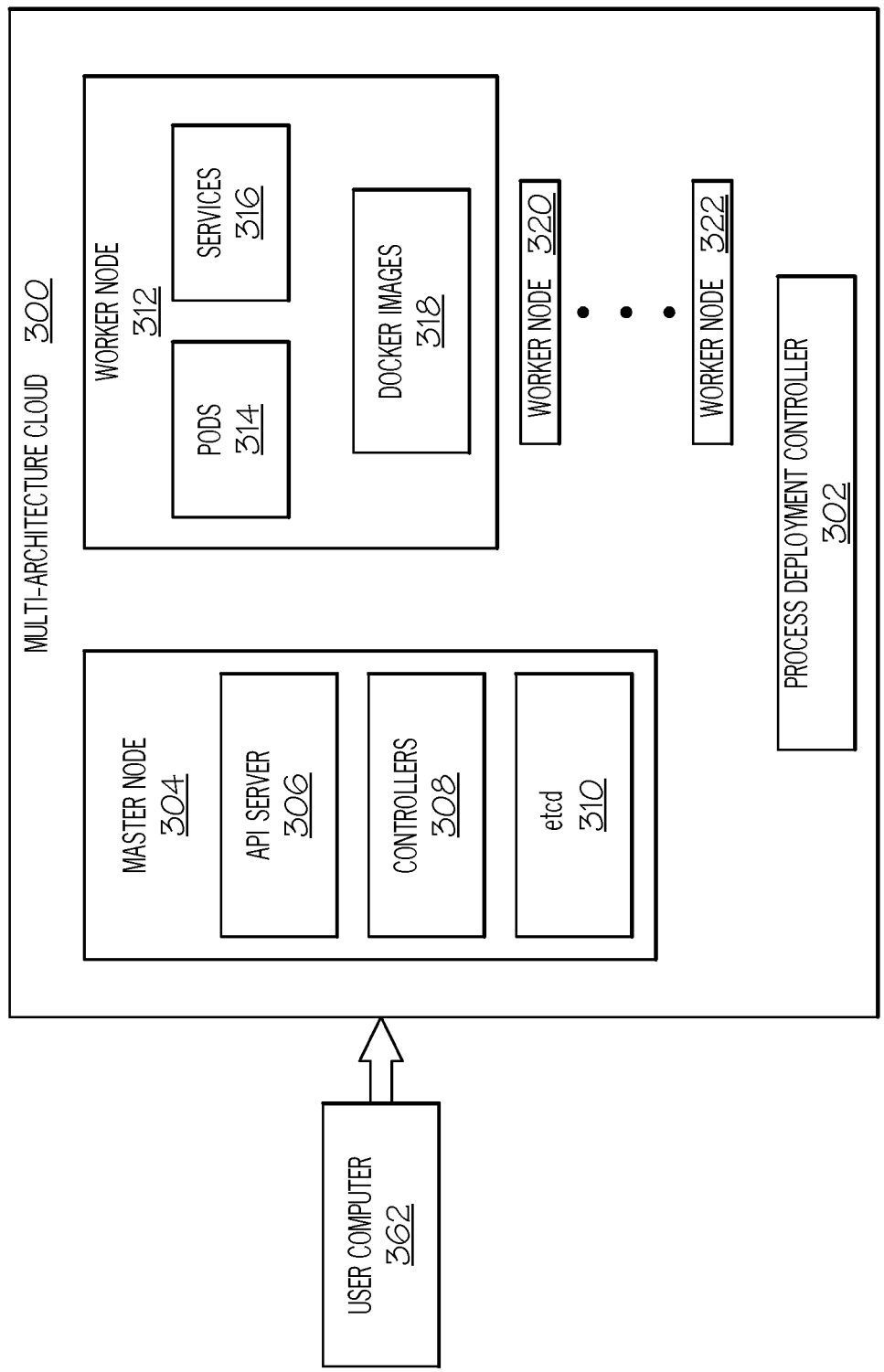
FIG. 3 depicts a high-level overview of a multi-architecture cloud used in one or more embodiments of the present invention.

With reference now to FIG. 3, a multi-architecture cloud 300 containing a master node 304 that manages multiple worker nodes, including exemplary worker node 312 (depicted in detail), worker node 320, and worker node 322. Depicted worker node 320 and worker node 322, as well as other worker nodes that are not depicted in FIG. 3, utilize similar architectures as shown for worker node 312. Although three worker nodes are depicted in the multi-architecture cloud 300, it is understood that the multi-architecture cloud 300 can contain more or less than three worker nodes.

As the name implies, multi-architecture cloud 300 is capable of supporting nodes that have different architectures. That is, worker node 312 can have a first operating system that runs on a first type of processor, worker node 320 can have a second operating system (different from the first operating system) that runs on a second type of processor (different from the second type of processor), etc. As such, different intermediary/DOCKER engines are often needed for each of the nodes, since each intermediary/DOCKER engine is specifically written to interface with a particular OS/kernel for a particular type of processor.

Assume now that a user of user computer 362 (analogous to user computer 162 shown in FIG. 1) wants to deploy one or more applications in the multi-architecture cloud 300. The user computer 362 communicates with the master node 304, which allows the user computer 362 to deploy applications to the worker nodes (e.g., worker node 312) for execution thereon.

In an embodiment of the present invention, the master node 304 is architected as a KUBERNETES® node (KUBERNETES is a registered trademark of The Linux Foundation Non-profit corporation in the United States and/or other countries). KUBERNETES a system that deploys and manages containers across disparate types of infrastructure/ architectures. One or more embodiments of the present invention utilizes KUBERNETES to deploy DOCKER engines, which enable containers to operate across nodes having disparate types of infrastructure/architectures.

In the embodiment in which the master node 304 is a KUBERNETES node, the master node 304 includes an application program interface (API) server 306, controllers 308, and etcd 310.

The API server 306 serves APIs (i.e., functions and procedures) that are needed by the user computer 362 to access resources and data in the worker nodes.

Controllers 308 activate and deactivate worker nodes, load balance work among worker nodes, join required services to certain nodes, etc.

Etcd 310 is a distributed database that tracks which worker nodes are deployed and what containers are within each of the deployed worker nodes.

Within each of the worker nodes are one or more pods 314 (analogous to pod 214 shown in FIG. 2), services 316 (e.g., APIs used by the worker node, a user interface provided by the worker node to the master node 304 for use by the user computer 362, etc.), and DOCKER images 318.

A DOCKER image, such as one or the DOCKER images 318 shown in FIG. 3, is created from a DOCKERFILE (i.e., a set of definitions for how the DOCKER image is to be defined), and provides a description of the infrastructure of the host computer system, including the host computer systems OS/kernel. The DOCKER image is used to interface with the host computer system, in order to create a pod, such as pod 214 shown in FIG. 2, that is able to interface with the host computer/host OS. As such, the DOCKER images 318 need to know about the infrastructure of the worker node 312 (e.g., host computer 202 shown in FIG. 2), including the types of resources (e.g., processor, memory, etc.) and/or the operating system (including the kernel) used by the worker node 312/host computer 202.

However, such information is often not available to the user computer 362 and/or the master node 304 for creating the DOCKER images 318. For example, while information about an x86 processor's architecture may be available, information about other processors' architectures, both modern architectures as well as older legacy architectures, is often not available. That is, information about such architectures either may not be in a registry of infrastructure descriptions, or the registry of infrastructure descriptions may be unavailable (e.g., protected by security measures) to the public.

Furthermore, a user may either have no access to a particular physical processor/computer, thus making an extraction of that processor/computer's OS and its infrastructure descriptions not possible.

Furthermore, even if a particular processor/computer is available, it could have no physical markings, and its OS might not provide enough documentation information to readily identify the processor/computer. For example, if the OS is a simple OS that only exists in the form of compiled binaries, without any useful documentation, then the prior art does not provide a useful process for identifying the OS and/or the processor that is runs on.

In order to address one or more of these issues, one or more embodiments of the present invention provides a new and novel process deployment controller that is able to build and utilize pods even if the identity and/or structure and/or operating system and/or description of the host computer are initially unknown to a process deployment controller.

Figure 4:
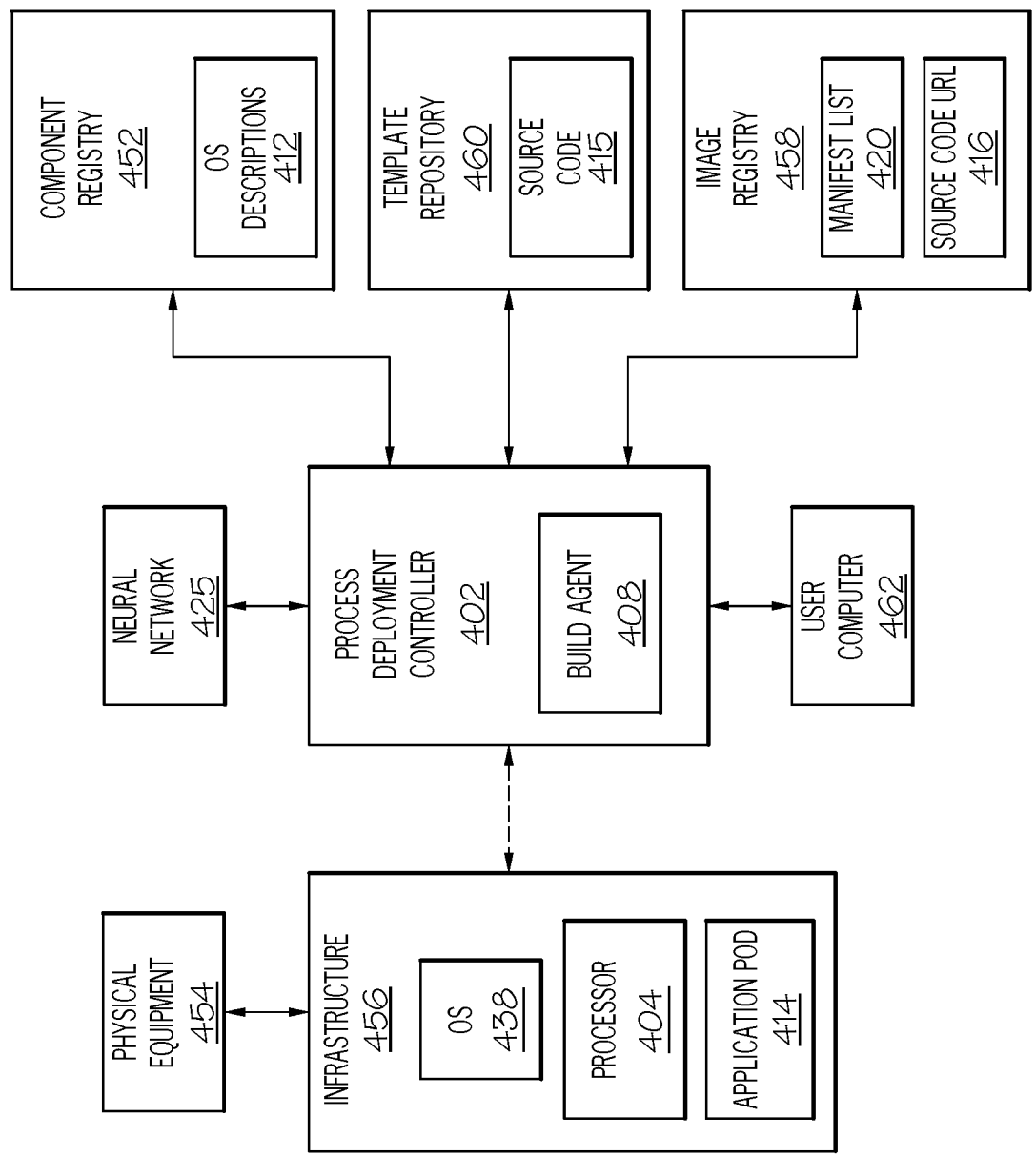
FIG. 4 illustrates a relationship among various resources and the process deployment controller illustrated in FIG. 3.

With reference now to FIG. 4, an overview of components used in one or more embodiments of the present invention is presented.

When a user of a user computer 462 (analogous to user computer 362 shown in FIG. 3) desires to deploy a pod (which contains one or more applications/processes) to a host computer, it does so through a process deployment controller 402 (analogous to process deployment controller 302 shown in FIG. 3) that, in a DOCKER environment, works in conjunction with a master node, such as master node 304 shown in FIG. 3.

A process deployment controller 402 is designed to be able to construct and utilize a pod that contains one or more applications, depicted as application pod 414, through the use of a build agent 408. That is, build agent 408 is logic that enables the process deployment controller 402 to create a pod for deployment to an infrastructure, such as infrastructure 456 (analogous to remote infrastructure 156 shown in FIG. 1), which contains its own operating system 438 (analogous to operating system 138) and has its own processor 404 (analogous to processor 104).

The process deployment controller 402 is able to retrieve an image (i.e., a detailed description of an infrastructure) from a manifest list 420 in an image registry 458.

Exemplary pseudocode used by the image registry 458 to create the manifest list 420 is:

```
{
    "schemaVersion": 2,
    "mediaType": "application/vnd.docker.distribution.manifest.list.v2+json",
    "manifests": [
        {
            "mediaType": "application/vnd.docker.image.manifest.v2+json",
            "size": 7143,
            "digest": "sha256:e692418e4cbaf90ca69d05a66403747baa33ee08806650b51fab815ad7fc331f",
            "platform": {
                "architecture": "ppc64le",
                "os": "linux",
            }
        },
        {
            "mediaType": "application/vnd.docker.image.manifest.v2+json",
            "size": 7682,
            "digest": "sha256:5b0bcabd1ed22e9fb1310cf6c2dec7cdef19f0ad69efa1f392e94a4333501270",
            "platform": {
                "architecture": "amd64",
                "os": "linux",
                "features": [
                    "sse4"
                ]
```

```
            }
         }
     ],
     src: "https://github.com/example/build-example.git"
}
```

If the process deployment controller 402 knows the identity/name of the processor 404 (e.g., an x86 processor) in the infrastructure 456, then it can send this identity/name to the image registry 458, which contains a listing of images (e.g., which include descriptions of operating systems for certain types of processors) in a manifest list 420. Thus, knowing the name of the processor gives the image registry 458 enough information to retrieve the needed image (i.e., a detailed description of the infrastructure of the processor, including its OS, processor, etc.) from the manifest list 420.

However, at times the image registry 458 is unable to return the needed image. For example, if the process deployment controller 402 does not know the identity and/or architecture of the infrastructure 456, then the image registry 458 does not know which image to return, and an error message is returned. Furthermore, if the process deployment controller 402 knows which image it needs, but this image is not in the manifest list 420, then an error message is returned.

Thus, if an error message is returned from the image registry 458 (indicating that it cannot return an image), then the image registry 458 also returns a source code uniform resource locator (URL) 416, which is an address/location of source code 415 within a template repository 460 that is used to create the image (e.g., of infrastructure 456 and/or OS 438 and/or the kernel within OS 438).

At this point, assume that the process deployment controller 402 does not know the details of the infrastructure, as indicated by the dashed line between the process deployment controller 402 and the infrastructure 456.

For example, if the process deployment controller 402 had known the identity of the processor 404 (e.g., the process deployment controller 402 knows that processor 404 is an x86 processor), then a component registry 452 could have matched this processor to a particular OS from OS descriptions 412. However, information stored in the OS descriptions 412 often is not available to the public (e.g., is protected by a firewall, encryption, etc.). In this scenario, and thus in one or more embodiments of the present invention, the process deployment controller 402 sends to the component registry 452 a partial image of the infrastructure 456 that describes processor 404, but not OS 438. The component registry 452 will complete the image of all of the infrastructure 456 with a description of OS 438 that it retrieves from the OS descriptions 412. The component registry 452 then returns this complete image of the infrastructure 456 (including a description of the components and functions in OS 438) to the process deployment controller 402. The process deployment controller 402 then uses this complete image to create and/or deploy the intermediary engine 207 (e.g., a DOCKER engine) to the worker node(s).

However, there are also situations in which the process deployment controller 402 has direct access to infrastructure 456, but does not know what it is. For example, infrastructure 456 can be a legacy system that does not contain identification markings (either external or within its software), and thus process deployment controller 402 does not know what type of processor the processor 404 is, nor does it know what type of operating system the OS 438 is. An exemplary legacy system of this type can be a controller/microcontroller for an old piece of equipment (e.g., a pump in a refinery), depicted in FIG. 4 as physical equipment 454. In order to identify what type of processor the processor 404 is, and what type of operating system the OS 438 is, in one or more embodiments of the present invention the process deployment controller 402 utilizes a neural network 425 to identify the OS 438, and thus the processor 404 associated with that OS 438, in order to enable the build agent 408 to construct the image needed to build the intermediary engine 207 shown in FIG. 2.

Figure 5:
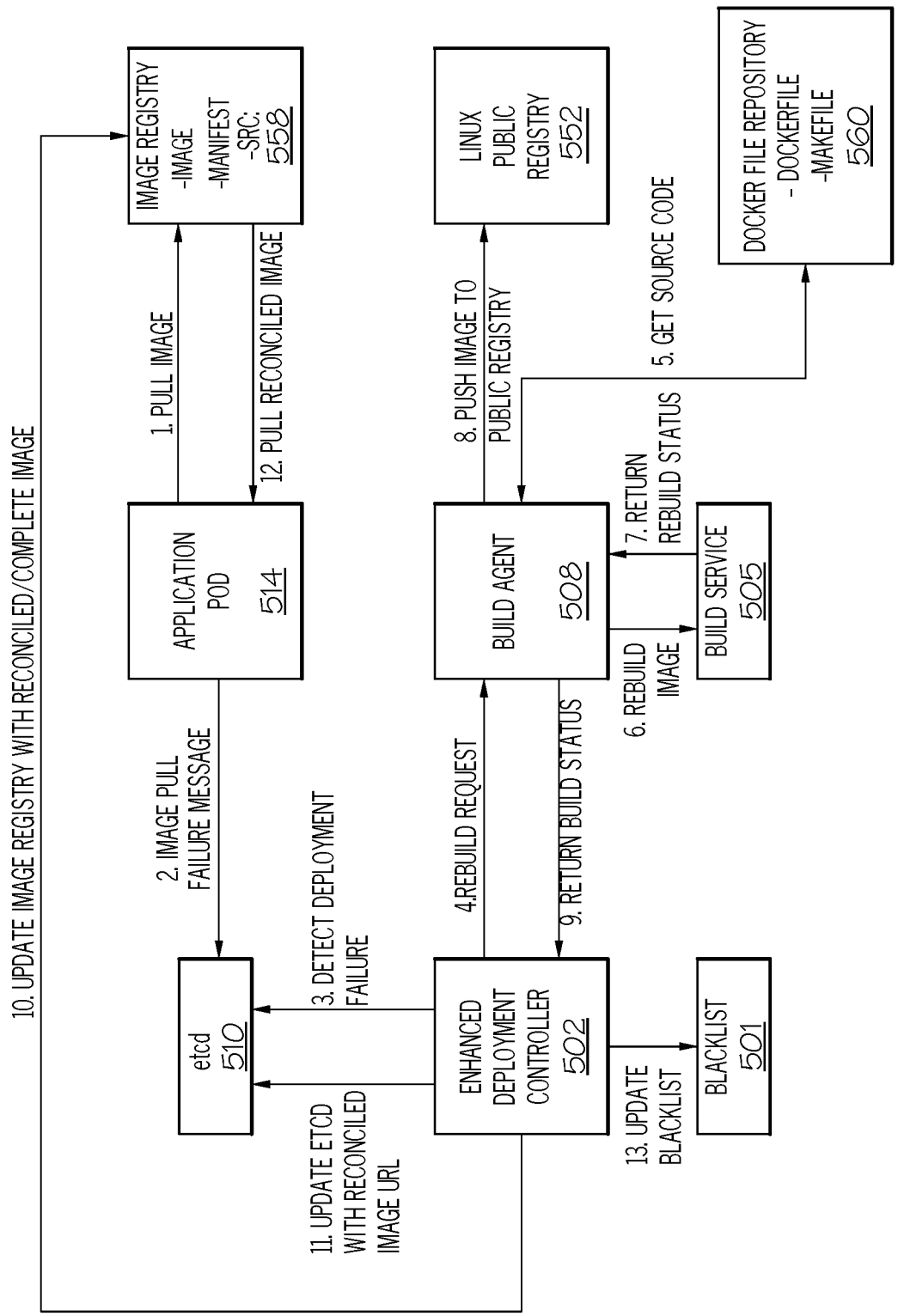
FIG. 5 depicts an exemplary embodiment of the present invention.

With reference now to FIG. 5, an overview of components of, and processes used by, one or more embodiments of the present invention is presented.

As shown in FIG. 5, an application pod 514 (analogous to application pod 414 shown in FIG. 4 and pod 214 shown in FIG. 2) tries to pull an image from an image registry 558 (analogous to image registry 458 shown in FIG. 4), as shown in step 1. However, as shown in step 2, the image registry 558 was unable to provide an image to the application pod 514, since the application pod 514 did not know the name of the infrastructure upon which is was operating, did not know details of the infrastructure's operating system, etc., as described above. As such, a message describing this failure is sent to the etcd 510 (analogous to the etcd 310 shown in FIG. 3).

Since the image registry 558 includes the "src" field that contains the URL of source code (e.g., source code URL 416 shown in FIG. 4) that is needed to construct a framework for a DOCKER image, and since this URL is available to the enhanced deployment controller 502, this gives the enhanced deployment controller 502 the ability to retrieve the source code 415 shown in FIG. 4. This enables the enhanced deployment controller 502 to create the image (of an infrastructure upon which an application will be deployed) needed to create the intermediary engine 207 shown in FIG. 2.

As such, once the enhanced deployment controller 502 detects the image pull failure in the etcd 510, as shown in step 3, it sends a rebuild request to a build agent 508 (analogous to build agent 408 shown in FIG. 4), as shown in step 4. That is, the enhanced deployment controller 502 sends a rebuild request to the build agent 508, which retrieves source code from a DOCKER file repository 560 (using the URL provided by the image registry 558), as shown in step 5. This source code is the source code 415 shown in FIG. 4, and allows the build agent 508 to send a message to a build service 505 to build/rebuild the image, as shown in step 6.

When operating in a KUBERNETES environment, exemplary pseudocode used by build service 505 to rebuild the image is:

```
apiVersion: build.knative.dev/v1alpha1
kind: Build
metadata:
    name: example-build
```

-continued

```
spec:
    serviceAccountName: build-auth-example
    source:
        git:
            url: https://github.com/example/build-example.git
            revision: master
    steps:
    -name: ubuntu-example
        image: ubuntu
        args: ["ubuntu-build-example", "SECRETS-example.md"]
    steps:
    -image: gcr.io/example-builders/build-example
        args: ['echo', 'hello-example', 'build']
```

As shown in step 7, the build service 505 returns the rebuild status of the image rebuild process to the build agent 508.

As shown in step 8, the build agent 508 then pushes the image (as rebuilt so far) to a LINUX® public registry 552 (LINUX is a registered trademark of Linus Torvalds in the United States and/or other countries), which is analogous to the component registry 452 shown in FIG. 4. This enables the build agent 508 to return the current build status (step 9) to the enhanced deployment controller 502. In an embodiment of the present invention, this current build status states that the OS description has been returned to the enhanced deployment controller 502, thus allowing the enhanced deployment controller 502 to complete the image. In another embodiment of the present invention, this current build status states that the LINUX public registry 552 has completed the build of the image, and has returned the completed image to the enhanced deployment controller 502.

As shown in step 10, the enhanced deployment controller 502 updates the image registry 558 with the reconciled/complete/completed image for the infrastructure at issue (e.g., infrastructure 456 shown in FIG. 4).

As shown in step 11, the enhanced deployment controller 502 returns the URL for the reconciled (completed) image to the etcd 510, which enables the application pod 514 to pull the reconciled/updated image from the image registry 558, as shown in step 12.

As shown in step 13, the enhanced deployment controller 502 updates a blacklist 501 of images that are not found in the image registry 558. That is, once the reconciled/complete image is created and added to the image registry 558, then it no longer belongs on a list (blacklist 501) of images that are not in the image registry 558. Thus, the reconciled/complete image that was just created is removed from the blacklist 501.

Figure 6:
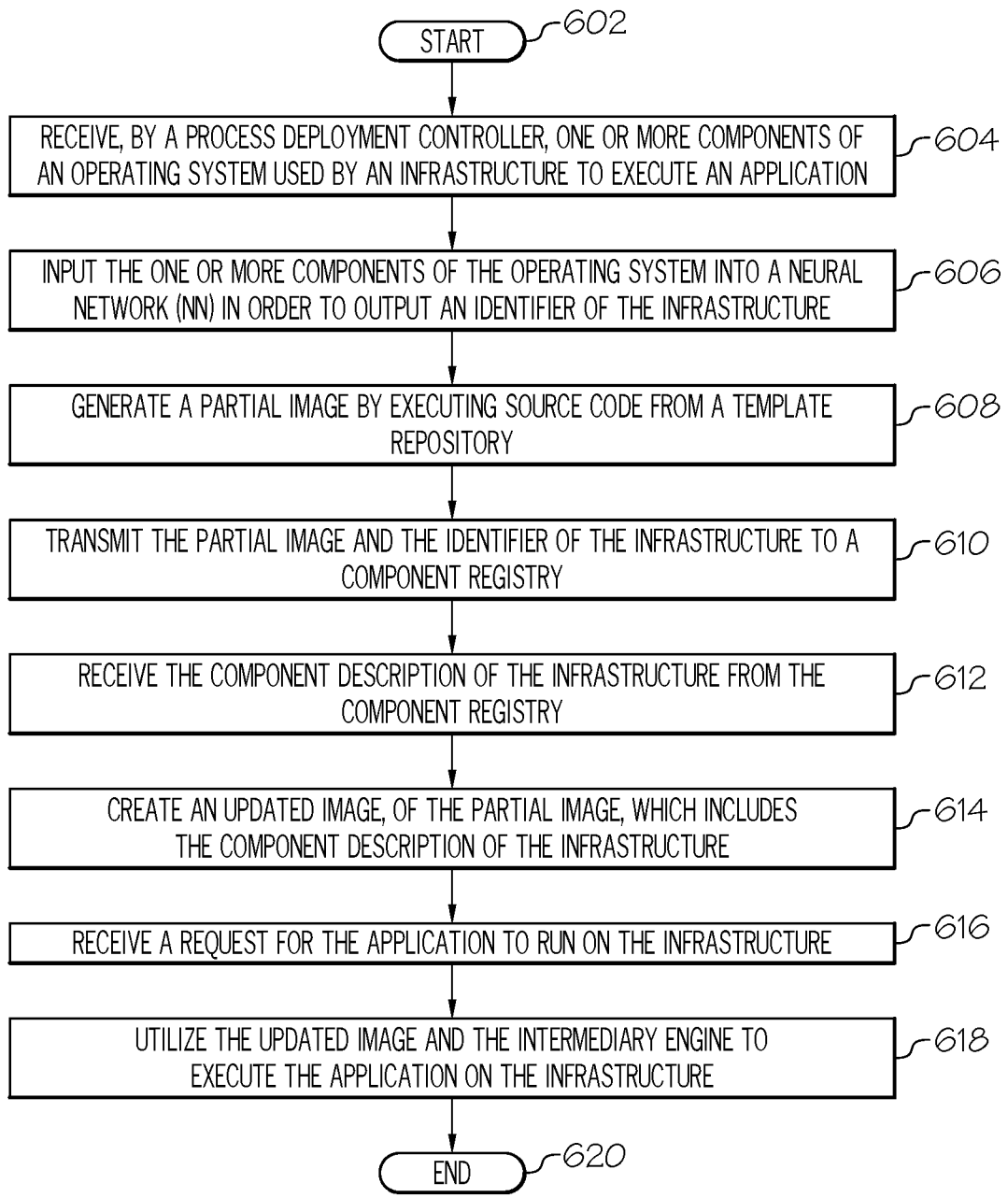
FIG. 6 is a high-level flow chart of a method performed in one or more embodiments of the present invention.

With reference now to FIG. 6, a high-level flow chart of steps performed by one or more embodiments of the present invention is presented.

After initiator block 602, a process deployment controller (e.g., the enhanced deployment controller 502 shown in FIG. 5) receives one or more components of an operating system used by a first infrastructure, as described in block 604. In an embodiment, these components are made up of source code. In another embodiment, these components are made up of compiled object code (binaries). In either embodiment (source code or binaries), the operating system is an entire operating system and/or just the kernel of the operating system. Furthermore, the name of the operating system/kernel is not described in the components (e.g., the name of the OS/kernel is not found in comments in the source code).

In an embodiment of the present invention, the operating system is received from a database of operating systems. In another embodiment of the present invention, the operating system is extracted directly from a system memory (e.g., system memory 136 shown in FIG. 1) using probes on an input/output (I/O) pin on the computer. That is, a probe on an I/O pin on the computer, or even on a processor itself (if the processor includes an on-board system memory), reads data from a memory on the computer/processor. Some, or all, of this extracted data (in the format of source code or as compiled binaries) will be the operating system for the computer/processor, which is then evaluated by artificial intelligence in order to identify the identity/name and/or type of operating system, and/or the entire infrastructure of the computer/processor.

In an embodiment of the present invention in which the operating system that is retrieved/extracted is source code, different functions are performed by segments of code that are separated (e.g., by no-operation instructions).

In an embodiment of the present invention in which the operating system that is retrieved/extracted is source code, different functions are performed by segments of code that are not separated.

In an embodiment of the present invention in which the operating system that is retrieved/extracted is binary code, the different functions are performed by segments of binaries that are recognizable of dividers (e.g., no-operation instructions).

In an embodiment of the present invention in which the operating system that is retrieved/extracted is binary code, the different functions are performed by segments of binaries that are not separated.

In any of these embodiments, the present invention is able, through the use of artificial intelligence, such as a neural network, to identify 1) the components of the operating system, 2) the name/type of the operating system, and/or 3) the types of processors that the operating system can run on.

Thus, as shown in block 606, the process deployment controller inputs the one or more components of the operating system into a neural network (NN), such as the neural network 425 shown in FIG. 4. That is, the NN utilizes the one or more components of the operating system as inputs in order to output an identifier of the operating system, and thus can identify the first infrastructure (the operating system and/or the processor upon which it runs).

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons in certain electronic neural networks are never technically "inhibitory", but are only "excitatory" to varying degrees. In other electronic neural networks, however, electronic neurons are capable of inhibitory signals, which reduce the ability of a follow-on neuron to produce a positive output.

Figure 7:
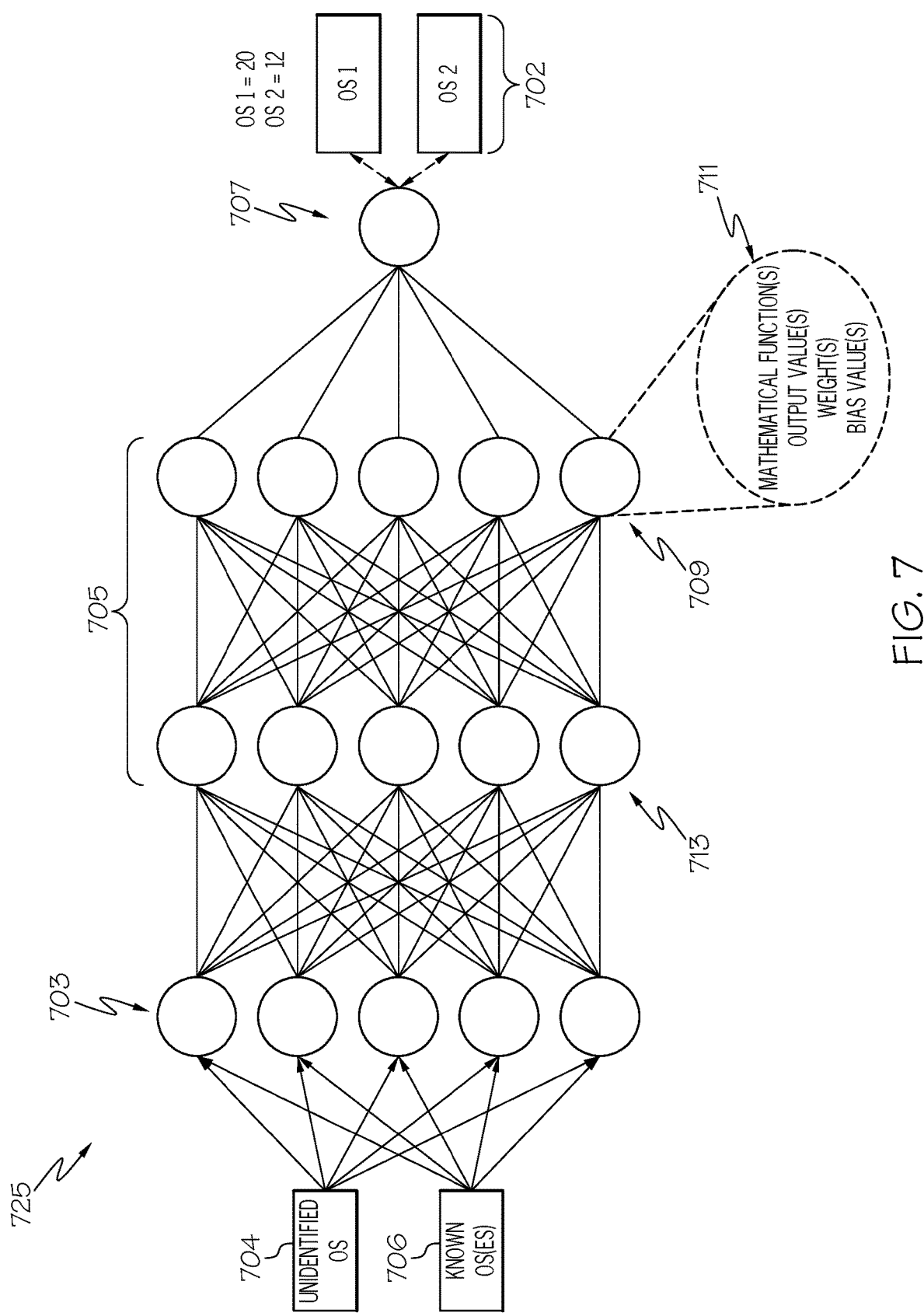
FIG. 7 illustrates an overview of a deep neural network (DNN) that is used in one or more embodiments of the present invention.
Figure 8:
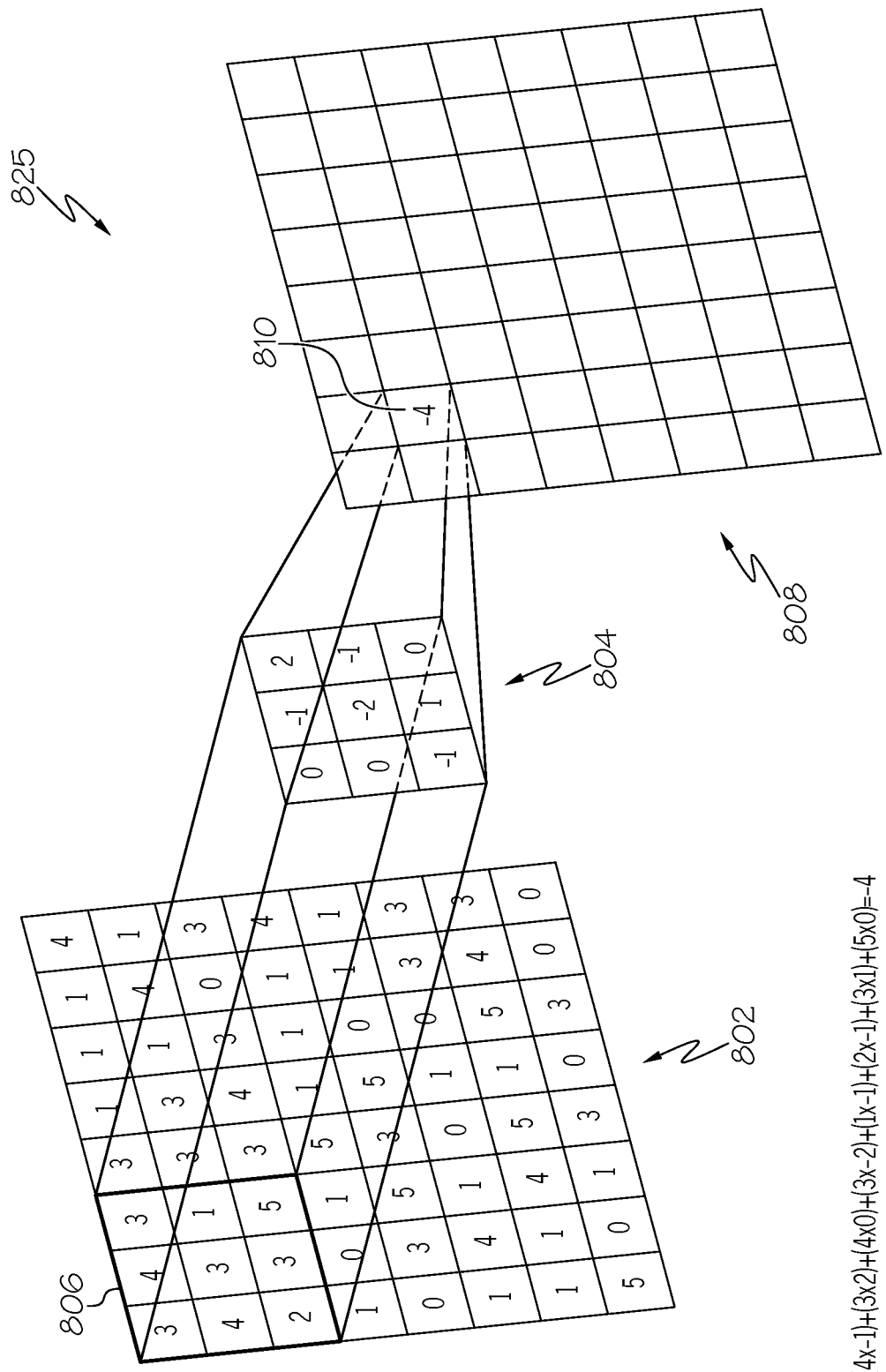
FIG. 8 and FIG. 9 depict a convolutional neural network (CNN) that is used in one or more embodiments of the present invention.
Figure 9:
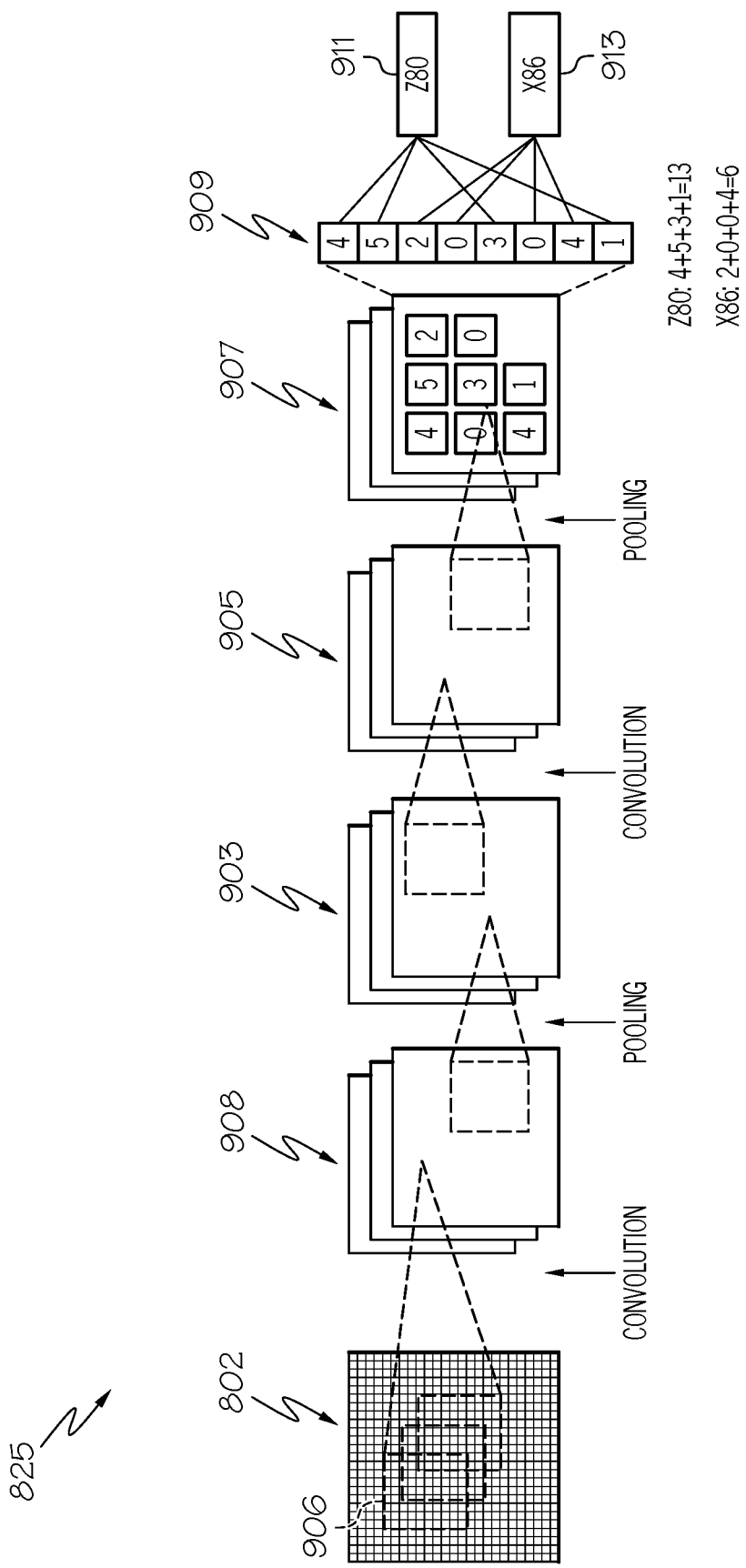

One type of neural network used in one or more embodiments of the present invention is a deep neural network (DNN), such as the deep neural network (DNN) 725 (analogous to the neural network 425 shown in FIG. 4), as shown in FIG. 7. Another type of neural network used in one or more embodiments of the present invention is a convolutional neural network (CNN), such as the convolutional neural network 825 (also analogous to the neural network 425 shown in FIG. 4), as shown in FIG. 8 and FIG. 9.

As indicated below, DNN 725 is preferably used when evaluating source code from an unknown operating system, and CNN 825 is preferably used when evaluating compiled binaries from an unknown operating system.

In a deep neural network (DNN), neurons are arranged in layers, known as an input layer, hidden layer(s), and an output layer. The input layer includes neurons/nodes that take input data, and send it to a series of hidden layers of neurons, in which neurons from one layer in the hidden layers are interconnected with neurons in a next layer in the hidden layers. The final layer in the hidden layers then outputs a computational result to the output layer, which is often a single node for holding vector information.

With reference now to FIG. 7, a deep neural network (DNN) 725 is used to identify an undefined operating system 704 (e.g., the OS 438 shown in FIG. 4 if it is unknown/unnamed/unidentified). As depicted in FIG. 7, DNN 725 inputs the unidentified OS 704 as well as one or more known operating systems 706 in order to identify the unidentified OS 704. In an embodiment of the present invention, DNN 725 is used if the unidentified OS 704 is source code, thus allowing the DNN 725 to recognize various blocks of source code as being typical for certain known operating systems.

As shown in FIG. 7, the electronic neurons in DNN 725 are arranged in layers, known as the input layer 703, hidden layers 705, and an output layer 707. The input layer 703 includes neurons/nodes that take input data, and send it to a series of hidden layers of neurons (e.g., hidden layers 705), in which neurons from one layer in the hidden layers are interconnected with neurons in a next layer in the hidden layers 705. The final layer in the hidden layers 705 then outputs a computational result to the output layer 707, which is often a single node for holding vector information. In an embodiment of the present invention, each neuron in the output layer 707 is associated with a particular output label from output labels 702, as shown in FIG. 7. Thus, the DNN 725 outputs labels that identify the unidentified OS 704, such as "OS 1" and "OS 2", in a ranked order, as discussed in further detail below.

As just mentioned, each node in the depicted DNN 724 represents an electronic neuron, such as the depicted neuron 709. As shown in block 711, each neuron (including exemplary neuron 709) includes at least four features: a mathematical function, an output value, a weight, and a bias value.

The mathematical function is a mathematic formula for processing data from one or more upstream neurons. For example, assume that one or more of the neurons depicted in the middle hidden layers 705 sent data values to neuron 709. Neuron 709 then processes these data values by executing the mathematical function shown in block 711, in order to create one or more output values, which are then sent to another neuron, such as another neuron within the hidden layers 705 or a neuron in the output layer 707. Each neuron also has a weight that is specific for that neuron and/or for other connected neurons. Furthermore, the output value(s) are added to bias value(s), which increase or decrease the output value, allowing the DNN 724 to be further "fine-tuned".

For example, assume that neuron 713 is sending the results of its analysis of a piece of data to neuron 709. Neuron 709 has a first weight that defines how important data coming specifically from neuron 713 is. If the data is important, then data coming from neuron 713 is weighted heavily, and/or increased by the bias value, thus causing the mathematical function (s) within neuron 709 to generate a higher output, which will have a heavier impact on neuron(s) in the output layer 707. Similarly, if neuron 713 has been determined to be significant to the operations of neuron 709, then the weight in neuron 713 will be increased, such that neuron 709 receives a higher value for the output of the mathematical function in the neuron 713. Alternatively, the output of neuron 709 can be minimized by decreasing the weight and/or bias used to affect the output of neuron 709. These weights/biases are adjustable for one, some, or all of the neurons in the DNN 725, such that a reliable output will result from output layer 707. Such adjustments are alternatively performed manually or automatically.

When manually adjusted, the weights and/or biases are adjusted by the user in a repeated manner until the output from output layer 707 matches expectations. For example, assume that DNN 725 is being trained to recognize a particular known operating system. As such, when input layer 703 receives the inputs from a known operating system as the unidentified OS 704, then DNN 725 (if properly trained by manually adjusting the mathematical function(s), output value(s), weight(s), and biases in one or more of the electronic neurons within DNN 725) outputs a correct output vector (e.g., OS 1—which is the known operating system) to the output layer 707.

When automatically adjusted, the weights (and/or mathematical functions) are adjusted using "back propagation", in which weight values of the neurons are adjusted by using a "gradient descent" method that determines which direction each weight value should be adjusted to.

As shown in FIG. 7, the output labels 702 are ranked according to how likely they are to describe/name/identify the unidentified OS 704 as being the known OS from known OS(es) 706. Thus, OS 1 (the known operating system that matches the same known operating when input, for training purposes, as the unidentified OS 704) is ranked higher than OS 2 (another known operating system that does not match the training OS as well as OS 1).

Thus, DNN 715 is trained to recognize certain patterns of code in actual unidentified operating systems, depicted as unidentified OS 704, in order to output certain output labels 702. These output labels 702 are ranked according to the likelihood of their labels actually identifying/describing the unidentified OS 704.

For example, assume that the hidden layers 705 compared various components from the unidentified OS 704 to various components of a first known OS (OS 1) from the known OS(es) 706, which results in a value from output layer 707 of 20, indicating how closely the various instructions from the unidentified OS 704 match various instructions from OS 1.

Assume further that the hidden layers 705 compared various components from the unidentified OS 704 to various components of a second known OS (OS 2) from the known OS(es) 706, which results in a value from output layer 707 of 12, indicating that there was less of a match between the unidentified OS 704 and OS 2. As such, OS 1 is ranked higher as the identity of the unidentified OS 704 than OS 2.

In an embodiment of the present invention, the DNN 725 is able to identify not only a particular operating system (e.g., OS 1, OS 2), but enables the identification of the infrastructure of the operating system itself or the hardware upon which it runs. That is, in this embodiment, DNN 725 is able to identify all of the components of the unidentified OS 704, which is enough to not only know the name (identifier) of the operating system, and also the processes/functions supported by this operating system. This allows a system to match the named operating system to a particular type of architecture/processor that this operating system is designed to operate thereon (as determined by examining a lookup table of operating systems and the processors that they respectively support). Thus, in this embodiment, the DNN 725 1) identifies all routines/functions in the operating system, which allows the DNN 725 to 2) identify the name of the operating system, thus enabling 3) the use of a lookup table to determine the type of system/processor that the operating system is designed on.

However, in another embodiment of the present invention, the DNN 725 is able to identify a particular operating system (e.g., OS 1, OS 2), it is not able to identify the infrastructure of the operating system itself and/or the hardware upon which it runs. That is, DNN 725 is only able to determine that a portion of the components of the unidentified OS 704 match a portion of the components of one or more of the known OS(es) 706, which is enough to know the name (identifier) of the operating system (e.g., the previously unknown operating system is now known to have the name OS 1). However, in this embodiment of the present invention, the DNN 725 is unable to identify all of the routines/functions of the operating system, but rather is just able to identify the name of the operating system. Even though the name of the operating system is now known, the routines/functions can still be unknown to the process deployment controller 402 shown in FIG. 4, since they may be secret (proprietary), or they could be from an operating system that is so obscure that it is not available to the process deployment controller 402. In this scenario, the process deployment controller 402 will send the name of the operating system (as determined by the DNN 725) to the component registry 452 shown in FIG. 4, which will retrieve the details of that operating system's routines/functions from the OS descriptions 412.

In some cases, the operating system 438 that can be retrieved from the infrastructure 456 is in the form of source code, while in other cases the operating system 438 that can be retrieved from the infrastructure 456 has already been compiled (and stored) into binaries. While DNN 725 is preferable for identifying an unknown operating system that is in the form of source code, a convolutional neural network is preferred when identifying an unknown operating system that is in the form of binaries.

A CNN is similar to a DNN in that both utilize interconnected electronic neurons, such as those described in FIG. 7. However, a CNN is different from a DNN in that 1) a CNN has neural layers whose sizes are based on filter sizes, stride values, padding values, etc. (see FIG. 8) and 2) utilize a convolution scheme to analyze binary data (see FIG. 9). A CNN gets its "convolutional" name based on a convolution (i.e., a mathematical operation on two functions to obtain a result) of filtering and pooling binaries data (a mathematical operation on two functions) in order to generate a predicted output (obtain a result).

CNNs are normally used to evaluated images in order to identify unknown objects depicted in those images. However, one or more embodiments of the present invention provides a new, useful, and nonobvious use of a CNN to evaluate binaries from a compiled unknown operating system, in order to identify that unknown operating system.

As described herein, a CNN process includes 1) a convolution stage (depicted in detail in FIG. 8), followed by a 2) pooling stage and a classification stage (depicted in FIG. 9).

With reference now to FIG. 8, a convolution scheme to analyze operating system binaries is presented in a CNN convolution process. As shown in FIG. 8, binary data from an unknown operating system populates an input table 802. Each cell in the input table 802 represents a value (e.g., a value between 1 and 8) of a fixed set of values from the extracted operating system. A subset of binary sets from the input table 802 is associated with a filter 804. That is, filter 804 is matched to a same-sized subset of binary sets (e.g., binaries subset 806) by sliding the filter 804 across the input table 802. The filter 804 slides across the input grid at some predefined stride (i.e., one or more binary units, each of which is depicted as a single cell). Thus, if the stride is "1", then the filter 804 slides over in increments of one (column) of binary sets. In the example shown in FIG. 8, this results in the filter 804 sliding over the subset of binary sets shown as binaries subset 806 (3,4,3,4,3,1,2,3,5 when read from left to right for each row) followed by filter sliding over the subset of binary sets just to the right of (4,3,3,3,1,3,2,5,3). If the stride were "2", then the next subset of binary sets that filter 804 would slide to would be (3,3,1,1,3,3,5,3,4), etc.

Filter 804 is applied against each binaries subset using a mathematical formula. That is, the values in the filter 804 are added to, subtracted to, multiplied by, divided by, or otherwise used in a mathematical operation and/or algorithm with the values in each subset of binary sets. For example, assume that the values in filter 804 are multiplied against the binary values shown in binaries subset 806 (($3\times0$)+($4\times-1$)+($3\times2$)+($4\times0$)+($3\times-2$)+($1\times-1$)+($2\times-1$)+($3\times1$)+($5\times0$)) to arrive at the value of −4. This value is then used to populate feature map 808 with the value of −4 in cell 810.

In a preferred embodiment, the convolution step also includes use of an activation function, which transforms the output of the convolution operation into another value. One purpose of the use of an activation function is to create nonlinearity in the CNN. A choice of specific activation function depends on an embodiment. Popular choices of an activation function include a rectified linear unit (ReLU), a leaky ReLU, a sigmoid function, a tanh function, and so on.

In an embodiment, each subset of binary sets uses a same filter. However, in a preferred embodiment, the filter used by each subset of binary sets is different, thus allowing a finer level of granularity in creating the feature map.

With reference now to FIG. 9, the pooling stage and a classification stage (as well as the convolution stage) of a CNN 825 during inference processing is depicted. That is, once the CNN is optimized by adjusting the stride of movement of the binaries subset 806 (see FIG. 8), and/or by adjusting the filter 804 shown in FIG. 8, then it is trusted to be able to recognize similar operating system binaries. This optimized CNN is then used to infer (hence the name inference processing) which operating system created the compiled binaries shown in input table 802.

Thus, as shown in FIG. 9, assume that binary sets from input table 802 from an unknown operating system are used as inputs to CNN 825, using a CNN that has been previously defined and optimized to recognize the certain operating systems and/or the processor upon which they are designed to operate. Assume further that a series of binaries subsets, including the binaries subset 906 (analogous to binaries subset 806 shown in FIG. 8) are convolved (using the process described in FIG. 8), thus resulting in a set of feature maps 908 (analogous to feature map 808 shown in FIG. 8). Once the feature maps 908 are generated, they are pooled into smaller pooled tables 903, in order to reduce the dimensionality of the values, thereby reducing the number of parameters and computations required in the CNN process. Once these pooled tables 903 are created, they themselves are then convoluted to create new (and even more compressed) feature maps 905, which are then pooled to create even more compressed pooled tables 907.

The pooled tables 907 (which in an embodiment is actually a single table) is "unrolled" to form a linear vector, shown in FIG. 9 as a fully connected layer 909, which provides a prediction output, such as prediction output 911 (i.e., a particular operating system used in a Z80 infrastructure) and prediction output 913 (i.e., another operating system used in an x86 infrastructure).

In one or more embodiments of the present invention, assume that for a prediction output to be considered accurate, it must have a total value of 10 or greater for the sum of values from cells in the fully connected layer 909 to which it is connected. As such, the prediction output 911 is connected to cells in the fully connected layer 909 that have the values of 4, 5, 3, and 1, resulting in a sum total of 13. Thus, the CNN 825 concludes that the array of binaries shown in input table 802 includes an operating system designed to operate on a Z80 processor. In one or more embodiments, an output function, such as a softmax function, amplifies larger output values, attenuates smaller output values, and normalizes all output values in order to ensure that their total sum is one. That is, rather than assigning an arbitrary number (e.g., 10) as being what the sum total of values in certain cells from the fully connected layer 909 must exceed in order to indicate that a particular entity (e.g., a Z80 infrastructure) is described by a new set of binaries, an output function such as a softmax function dynamically adjusts the output values and then normalizes them, such that they sum up to 1.0 or some other predetermined number. Thus, while the described values shown in FIG. 9 describe the concept of output values describing certain operating systems, in practice a static threshold value is not used in certain embodiments. Rather, in this alternative/preferred embodiment, the system utilizes a normalized summation (as just described), in order to further control the output characteristics, thus more accurately determining the label of the operating system.

As depicted in FIG. 9 for exemplary purposes, the prediction output 913 for an x86-based infrastructure is only 6 (2+0+0+4) based on the cells in the fully connected layer 909 to which it is attached. However, if the binary sets in array of binaries shown in input table 802 were for an operating system designed to operate on an x86-based processor, then the fully connected layer 909 (if properly trained) would result in the values of the cells in the fully connected layer 909 that are connected to the prediction output 911 to total less than 10, while the values of the cells in the fully connected layer 909 that are connected to the prediction output 913 would be more than 10.

In an embodiment of the present invention, the CNN 825 is able to identify a particular operating system (e.g., OS 1, shown as Z80 911 in FIG. 9; OS 2, shown as x86 913 in FIG. 9), as well as the infrastructure of the operating system itself or the hardware upon which it runs. That is, in this embodiment, CNN 825 is able to identify all components of the unidentified operating system whose binaries are shown in input table 802, which is enough to know the name (identifier) of the operating system, the processes/functions supported by this operating system, and the type of architecture/processor that this operating system is designed to operate thereon. Thus, in this embodiment, the CNN 825 is trained to 1) identify all routines/functions in the operating system, which allows the CNN 825 to 2) identify the name of the operating system, and to 3) enable the process deployment controller to refer to a lookup table to determine the type of system/processor that the operating system is designed on (e.g., through the use of a lookup table that associates certain operating systems with certain processors).

However, in another embodiment of the present invention, the CNN 825 is able to identify a particular operating system (e.g., OS 1, OS 2), but is not able to identify the components of the operating system itself and/or the hardware upon which it runs.

That is, in this other embodiment of the present invention, CNN 825 is only able to determine that a portion of the components of the unidentified operating system represented by the input table 802 match a portion of the components of one or more of the known operating systems, which is enough to know the name (identifier) of the operating system (e.g., the previously unknown operating system is now known to have the name OS 1). However, in this other embodiment of the present invention, the CNN 825 is unable to identify all of the routines/functions of the operating system. That is, even though the process deployment controller 402 shown in FIG. 4 knows the name of the operating system, the routines/functions can still be unknown to the process deployment controller 402, since they may be secret (proprietary), or could be from an operating system that is so obscure that it is not available to the process deployment controller 402. As such, the details of the operating system still need to be obtained from the OS descriptions 412 shown in FIG. 4.

Returning now to FIG. 6, and as described in block 608, the process deployment controller generates a first partial image by executing first source code from a template repository. That is, the first partial image (as rebuilt during step 6 in FIG. 5) provides a first structure (i.e., a template) used to create a first intermediary engine (e.g., intermediary engine 207 shown in FIG. 2, which in one or more embodiments of the present invention is a DOCKER engine) to be used by a first container (see containers 201 in FIG. 2). As shown in FIG. 2, the first container includes an application (e.g., application 203a shown in FIG. 2); and binaries and libraries (e.g., binaries and libraries 205a shown in FIG. 2) required to execute the application in the first infrastructure (e.g., infrastructure 456 shown in FIG. 4) via the first intermediary engine. However, in an embodiment of the present invention, the first partial image lacks a component description of the first infrastructure, and the component description of the first infrastructure is inaccessible to the process deployment controller.

As described in block 610, the process deployment controller transmits the first partial image and the identifier of the first infrastructure to a component registry (e.g., component registry 452 shown in FIG. 4 and/or LINUX public registry 552 shown in FIG. 5), which contains the component description of the first infrastructure. That is, the component registry contains a detailed description of an operating system, whose name is provided in the identifier (e.g., OS 1) of the first infrastructure (which is an operating system, in this example).

As described in block 612, the process deployment controller receives the component description of the first infrastructure (e.g., details of components/functions/routines found in the operating system whose identity/name is provided by the process deployment controller) from the component registry.

As described in block 614, the process deployment controller creates a first updated image of the first partial image, where the first updated image comprises the component description of the first infrastructure. In the case of a DOCKER system, this first updated image is a complete DOCKER image of the infrastructure needed to create the DOCKER engine described above.

As described in block 616, the process deployment controller receives a request for the application to run on the first infrastructure, and then utilizes the first updated image and the first intermediary engine to execute the application on the first infrastructure, as described in block 618. That is, once the complete DOCKER engine (first updated image) is available for use on the infrastructure (i.e., a particular host operating system and host processor), the application is run on that infrastructure.

The flow chart ends at terminator block 620.

In an embodiment of the present invention, the process deployment controller transmits a request to an image registry (e.g., image registry 458 shown in FIG. 4) for the first updated image. As described above, the image registry contains a plurality of images that provide structures for creating containers. As shown in steps 2 and 3 in FIG. 5, the (enhanced) process deployment controller that is able to create updated image files, receives an error message from the image registry indicating that the requested first updated image is not in the image registry. As described above, the error message includes a uniform resource locator (e.g., source code URL 416 shown in FIG. 4) for the first source code (e.g., source code 415 shown in FIG. 4) that is used to build the first partial image. In response to receiving the error message from the image registry, the process deployment controller utilizes the URL to retrieve the first source code from the template repository (e.g., template repository 460 shown in FIG. 4). As described herein, in an embodiment of the present invention, the image registry contains a manifest of multiple DOCKER images.

In an embodiment of the present invention, the process deployment controller and/or a user updates the manifest of multiple DOCKER images with the first updated image, and then append a uniform resource locator (URL) of the component description of the infrastructure, which was initially inaccessible to the process deployment controller, to the first updated image in the manifest of multiple DOCKER images. That is, a URL for retrieving the first updated image is appended to the component description, such that the image (e.g., a particular DOCKER image) is quickly retrievable.

As described herein, in one or more embodiments of the present invention, the one or more components of the operating system (needed to create the DOCKER image) is a kernel of the operating system.

As described above, in one or more embodiments of the present invention the process deployment controller is a KUBERNETES controller.

Thus, use of a KUBERNETES controller enables one or more embodiments of the present invention to customize a KUBERNETES deployment resource definition, in order to provide an image uniform resource locator (URL) to the KUBERNETES controller, where the image URL enables the KUBERNETES controller to retrieve the first updated image from an image registry. That is, once the first updated image is created, the KUBERNETES controller is able to use an image URL to retrieve that image (e.g., a DOCKER file) from the image registry.

In an embodiment of the present invention, the process deployment controller generates a second partial image, which lacks a component description of a second infrastructure used to execute the application. The process deployment controller transmits the second partial image to a customized image registry (e.g., the image registry 458 that now contains the second partial image), which contains the component description of the second infrastructure used to execute the application, and receives a second updated image of the second partial image from the customized image registry, which includes the component description of the second infrastructure. The process deployment controller then uses the second updated image and a second intermediary engine to execute the application on the second infrastructure. That is, by having different images available from the (customized) image registry, the same application can be run on different infrastructures (operating systems, processors, etc.). In an embodiment of the present invention, these executions of the same application (e.g., same containers) on different infrastructures occur simultaneously, such that the same application is running on different infrastructures at the same time.

As depicted and described in FIG. 8 and FIG. 9, in an embodiment of the present invention, the neural network (NN) used to identify a name of the infrastructure (the operating system and/or the processor thereon) is a convolutional neural network (CNN).

In an embodiment of the present invention, executing the application on the first infrastructure modifies a controller of a physical unit of equipment, such that modifying the controller improves an operation of the physical unit of equipment by modifying operations of the physical unit of equipment. For example, assume that the method described herein identifies what operating system is used in the infrastructure 456 shown in FIG. 4, and that infrastructure 456 is a controller for physical equipment 454 (e.g., a pump in a refinery). By knowing about the operating system 438 (and/or the processor 404 that runs that operating system 438), an intermediary engine such as a DOCKER engine is now available to seamlessly upgrade the controller with new containers, thereby improving the functionality of the physical equipment 454.

For example, assume that the controller was initially just a dedicated processor for controlling the physical equipment 454. In that scenario, any modifications to the controller, and thus operations of the physical equipment 454, would not be possible if the identity of the operating system for that dedicated processor are unknown. However, by using one or more embodiments of the present invention, the identity of the operating system is identified, thus permitting the use of an intermediary engine (e.g., a DOCKER engine), such that the controller can be upgraded (e.g., modified to enable a pump to operate at higher pressures, react to previously unidentified new conditions such as new incoming feedstock by raising or lowering its pump speed, etc.), thereby improving the functionality of the pump.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
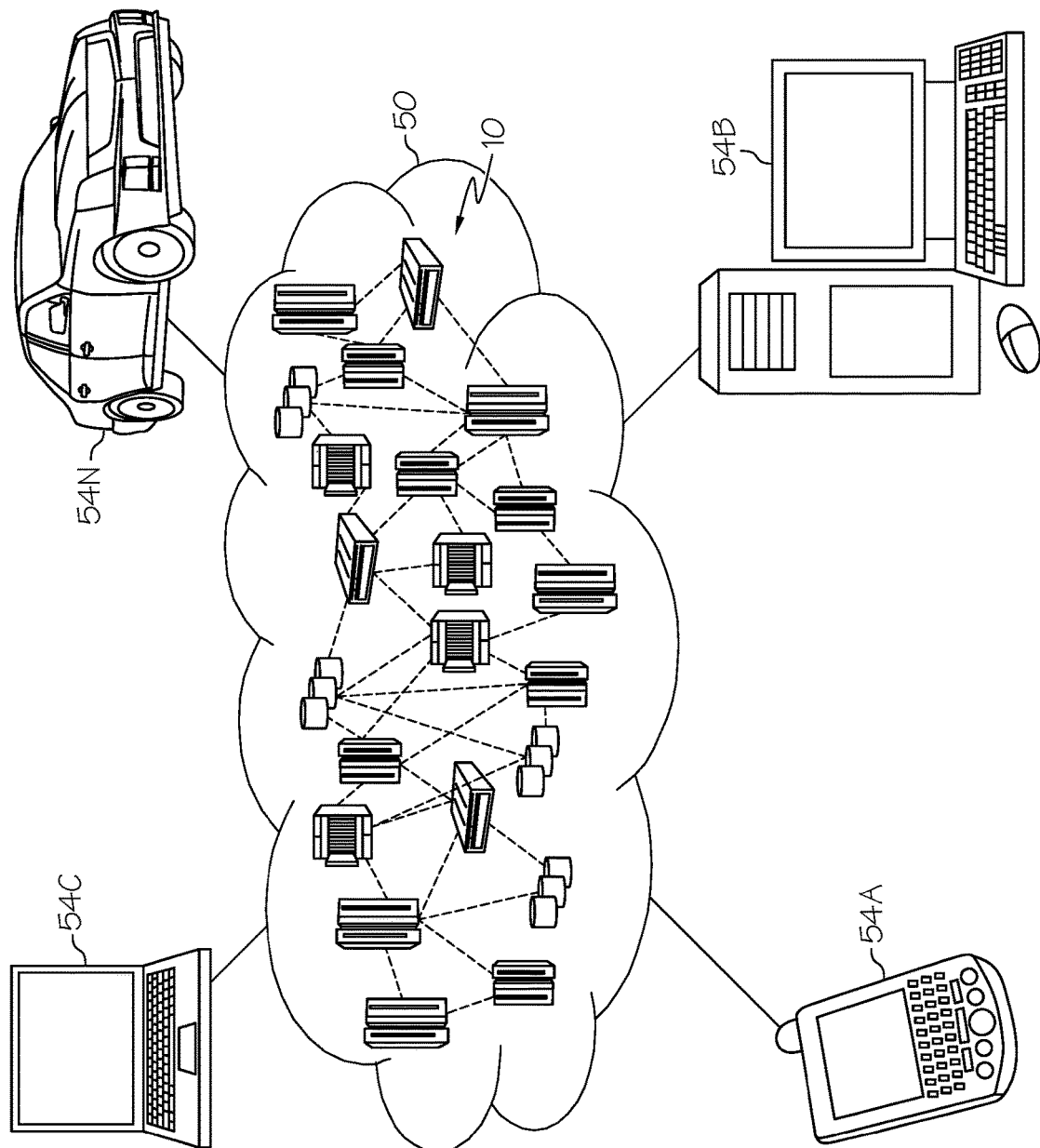
FIG. 10 depicts a cloud computing environment according to an embodiment of the present invention.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 10 are intended to be illustrative only and that computing nodes 10 and cloud computing environment 50 can communicate with any type of computerized device over any type of network and/or network addressable connection (e.g., using a web browser).

Figure 11:
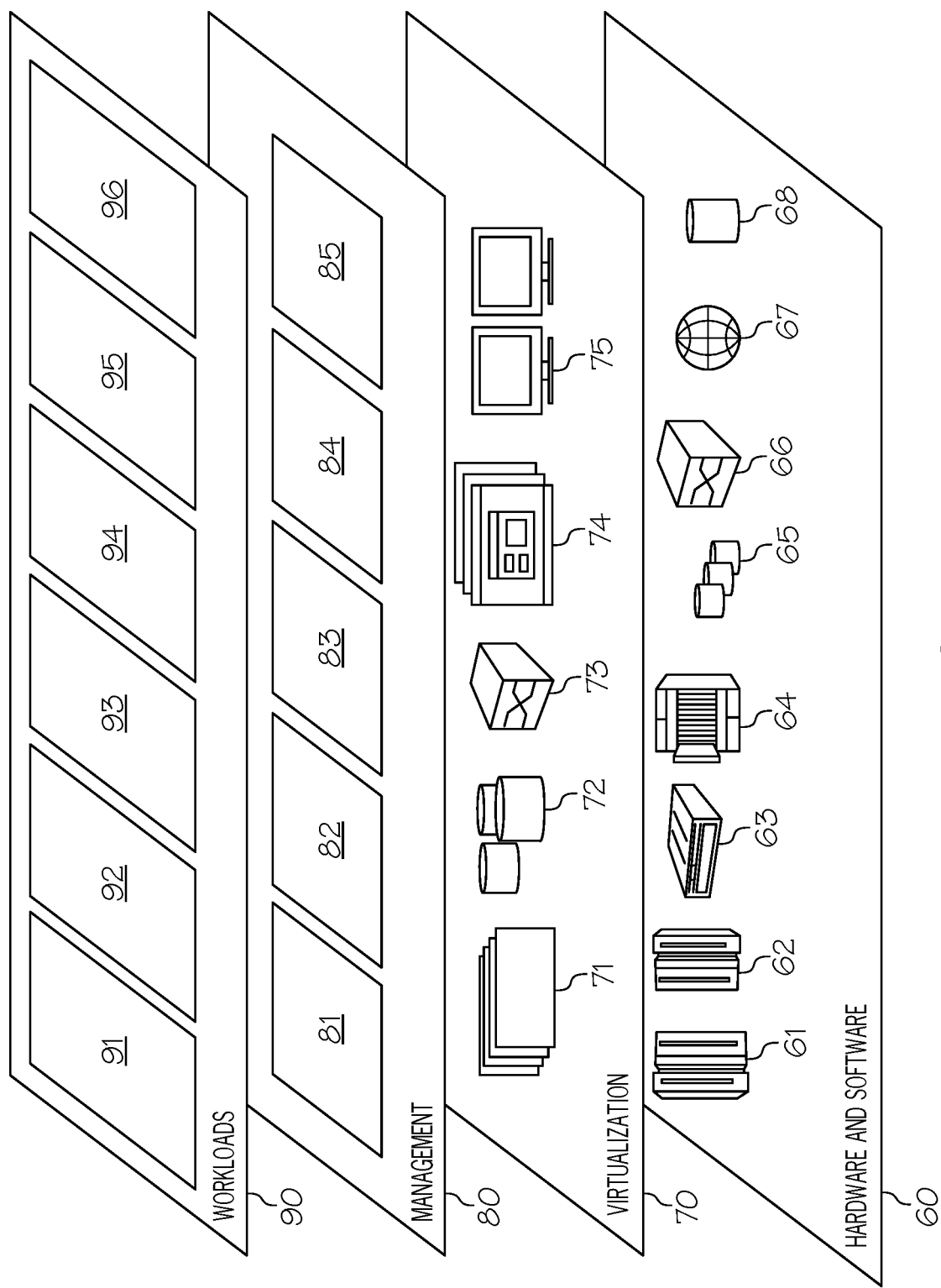
FIG. 11 depicts abstraction model layers of a cloud computer environment according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and infrastructure image creation and utilization processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
generating, by a process deployment controller, a first partial image by executing first source code from a template repository, wherein the first partial image provides a first structure used to create a first intermediary engine used with a container, wherein the container comprises an application, wherein the container further comprises binaries and libraries required to execute the application in a first infrastructure via the first intermediary engine, wherein the first partial image lacks a component description of the first infrastructure, and wherein the component description of the first infrastructure is initially inaccessible to the process deployment controller;
transmitting, by the process deployment controller, an identifier of the first infrastructure to a component registry, wherein the component registry contains the component description of the first infrastructure;
receiving, by the process deployment controller, the component description of the first infrastructure from the component registry;
creating, by the process deployment controller, a first updated image of the first partial image, wherein the first updated image comprises the component description of the first infrastructure;
receiving, by the process deployment controller, a request for the application to run on the first infrastructure;
utilizing the first updated image and the first intermediary engine to execute the application on the first infrastructure;
transmitting, by the process deployment controller, a request to an image registry for the first updated image, wherein the image registry contains a plurality of images that provide structures for creating containers;
receiving, by the process deployment controller, an error message from the image registry indicating that the requested first updated image is not in the image registry, wherein the error message comprises a uniform resource locator (URL) for the first source code used to build the first partial image; and
in response to receiving the error message from the image registry, utilizing, by the process deployment controller, the URL to retrieve the first source code from the template repository.

2. The method of claim 1, further comprising:
receiving, by the process deployment controller, one or more components of an operating system used by the first infrastructure; and
inputting, by the process deployment controller, the one or more components of the operating system into a neural network (NN), wherein the NN utilizes the one or more components of the operating system to output the identifier of the first infrastructure.

3. The method of claim 2, wherein the one or more components of the operating system is a kernel of the operating system.

4. The method of claim 2, wherein the neural network (NN) is a convolutional neural network (CNN), and wherein the one or more components of the operating system are compiled binaries of the operating system.

5. The method of claim 1, wherein the image registry contains a manifest of multiple DOCKER images.

6. The method of claim 5, further comprising:
updating the manifest of multiple DOCKER images with the first updated image; and
appending a uniform resource locator (URL) of the component description of the first infrastructure, which is initially inaccessible to the process deployment controller, to the first updated image in the manifest of multiple DOCKER images.

7. The method of claim 1, wherein the process deployment controller is a KUBERNETES controller.

8. The method of claim 7, further comprising:
customizing a KUBERNETES deployment resource definition to provide an image uniform resource locator (URL) to the KUBERNETES controller, wherein the image URL enables the KUBERNETES controller to retrieve the first updated image from an image registry.

9. The method of claim 1, further comprising:
generating, by the process deployment controller, a second partial image by executing second source code from the template repository, wherein the second partial image provides a second structure used to create a second intermediary engine used with the container, wherein the second partial image lacks a component description of the second infrastructure, and wherein the component description of the second infrastructure is inaccessible to the process deployment controller;
transmitting, by the process deployment controller, an identifier of the second infrastructure to the component registry, wherein the component registry contains the component description of the second infrastructure;
receiving, by the process deployment controller, the component description of the second infrastructure from the component registry;
creating, by the process deployment controller, a second updated image of the second partial image, wherein the second updated image comprises the component description of the second infrastructure;
receiving, by the process deployment controller, a request for the application to run on the first infrastructure and the second infrastructure; and
utilizing the second updated image and the second intermediary engine to execute the application on the second infrastructure while the application is also being executed on the first infrastructure.

10. The method of claim 1, wherein executing the application on the first infrastructure modifies a controller of a physical unit of equipment, and wherein modifying the controller improves an operation of the physical unit of equipment by modifying operations of the physical unit of equipment.

11. A computer program product comprising a computer readable storage medium having program code embodied therewith, wherein the computer readable storage medium is not a transitory signal per se, and wherein the program code is readable and executable by a processor to perform a method comprising:
generating a partial image by executing source code from a template repository, wherein the partial image provides a structure used to create an intermediary engine used with a container, wherein the container comprises an application, wherein the container further comprises binaries and libraries required to execute the application in an infrastructure via the intermediary engine, wherein the partial image lacks a component description of the infrastructure, and wherein the component description of the infrastructure is initially inaccessible to a process deployment controller that generated the partial image;
transmitting an identifier of the infrastructure to a component registry, wherein the component registry contains the component description of the infrastructure;
receiving the component description of the infrastructure from the component registry;
creating an updated image of the partial image, wherein the updated image comprises the component description of the infrastructure;
receiving a request for the application to run on the infrastructure;
utilizing the updated image and the intermediary engine to execute the application on the infrastructure;
transmitting a request to an image registry for the updated image, wherein the image registry contains a plurality of images that provide structures for creating containers;
receiving an error message from the image registry indicating that the requested updated image is not in the image registry, wherein the error message comprises a uniform resource locator (URL) for the source code used to build the partial image; and
in response to receiving the error message from the image registry, utilizing the URL to retrieve the source code from the template repository.

12. The computer program product of claim 11, wherein the method further comprises:
receiving a kernel of an operating system used by the infrastructure; and
inputting the kernel of the operating system into a convolutional neural network (CNN), wherein the CNN utilizes the kernel of the operating system to output the identifier of the infrastructure.

13. The computer program product of claim 11, wherein the image registry contains a manifest of multiple DOCKER images, and wherein the method further comprises:
updating the manifest of multiple DOCKER images with the updated image; and
appending a uniform resource locator (URL) of the component description of the infrastructure that is initially inaccessible to the process deployment controller to the updated image in the manifest of multiple DOCKER images.

14. The computer program product of claim 11, wherein the process deployment controller is a KUBERNETES controller, and wherein the method further comprises:
customizing a KUBERNETES deployment resource definition to provide an image uniform resource locator (URL) to the KUBERNETES controller, wherein the image URL enables the KUBERNETES controller to retrieve the updated image from the image registry.

15. The computer program product of claim 11, wherein the program code is provided as a service in a cloud environment.

16. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

receiving one or more components of an operating system used by an infrastructure;

inputting the one or more components of the operating system into a convolutional neural network (CNN), wherein the CNN utilizes the one or more components of the operating system to output an identifier of the infrastructure;

generating a partial image by executing source code from a template repository, wherein the partial image provides a structure used to create an intermediary engine used with a container, wherein the container comprises an application, wherein the container further comprises binaries and libraries required to execute the application in the infrastructure via the intermediary engine, wherein the partial image lacks a component description of the infrastructure, and wherein the component description of the infrastructure is initially inaccessible to a process deployment controller that generated the partial image;

transmitting the partial image and the identifier of the infrastructure to a component registry, wherein the component registry contains the component description of the infrastructure;

receiving the component description of the infrastructure from the component registry;

creating an updated image of the partial image, wherein the updated image comprises the component description of the infrastructure;

receiving a request for the application to run on the infrastructure; and utilizing the updated image and the intermediary engine to execute the application on the infrastructure.

17. The computer system of claim 16, wherein the method further comprises:

transmitting a request to an image registry for the updated image, wherein the image registry contains a plurality of images that provide structures for creating containers;

receiving an error message from the image registry indicating that the requested updated image is not in the image registry, wherein the error message comprises a uniform resource locator (URL) for the source code used to build the partial image; and in response to receiving the error message from the image registry, utilizing the URL to retrieve the source code from the template repository.

18. The computer system of claim 16, wherein the stored program instructions are provided as a service in a cloud environment.

* * * * *